United States Patent [19]

Brockington et al.

[11] Patent Number: 5,525,655

[45] Date of Patent: Jun. 11, 1996

[54] WATER BASED STENCIL FILLER

[75] Inventors: R. Rhett Brockington, Columbia; J. Gregg Bourne, North, both of S.C.

[73] Assignee: Anchor Continental, Inc., Columbia, S.C.

[21] Appl. No.: 355,136

[22] Filed: Dec. 13, 1994

Related U.S. Application Data

[63] Continuation-in-part of Ser. No. 237,963, May 4, 1994, abandoned, which is a continuation of Ser. No. 669,842, Mar. 15, 1991, abandoned.

[51] Int. Cl.[6] .............................. C08L 93/04; C08L 7/02; C08L 9/08; C08L 13/02
[52] U.S. Cl. .................. 524/274; 524/501; 524/522; 524/526; 524/272; 564/798
[58] Field of Search ..................................... 524/270, 272, 524/274, 798, 501, 522, 526

[56] References Cited

U.S. PATENT DOCUMENTS

| | | | |
|---|---|---|---|
| 4,183,834 | 1/1980 | Evans et al. | 524/798 |
| 4,419,481 | 12/1983 | Schwartz | 524/272 |
| 4,477,613 | 10/1984 | Evans et al. | 524/272 |

*Primary Examiner*—Peter A. Szekely
*Attorney, Agent, or Firm*—Rhett Brockington

[57] ABSTRACT

A water based stencil filler that can be cleaned off monuments with a water wash, the filler being comprised of a tackified elastomer aqueous dispersion formulation containing (a) a rosin derived resinous composition which is a substantially a polyhydric alcohol rosin ester dispersion, (b) a carboxyl-containing rosin derived resinous composition having an acid value of from 30 to 150 and a softening point of from -25 C to 150 C, at least partially neutralized with a counter ion capable of carrying the resinous composition into solution or dispersion in water, (c) a supplemental surfactant, and (d) a rubber.

9 Claims, No Drawings

WATER BASED STENCIL FILLER

The invention relates to stencil fillers, and more particularly to stencil fillers which are tackified elastomeric dispersions or emulsions, which when dried at room temperature form a water sensitive coating that adhesively bonds stencil to stone. The instant invention is a Continuation-In-Part Application of a previously filed application that is currently pending before the united States Patent and Trademark Office. The previously filed application bears Ser. No.: 08/237,963, filed on May 4, 1994 now abandoned as a file wrapper continuation of Ser. No.: 07/669,842 filed on Mar. 15, 1991, now abandoned and is entitled WATER WASHABLE MONUMENT STENCIL FILLER, the specification and drawings of which are hereby incorporated by reference.

BACKGROUND OF THE INVENTION

The stenciling process used to etch stone faces in the monument industry involves sandblasting stone areas outlined by a rubber stencil sheet. Stencil is basically a thick piece of rubber (approximately 15-45 millimeters) coated with a pressure sensitive adhesive. After the rubber stencil is adhesively affixed to the stone, lettering and decorative ornamentation are drawn or transferred onto the rubber stencil. The appropriate portions are then cut and removed leaving a design template. After sandblasting, the design template is peeled away from the stone face and the etched design remains.

However, the surface of stone monuments, where the stone is most commonly granite, is frequently rough and pitted either as a result of the quarrying cutting process or as a consequence of a prior sandblasting step. In order to create a smooth surface on which the rubber stencil will adhere, the monument surface is primed with a coating known as stencil (a.k.a. sandblast) filler. Typically stencil filler is a slightly tackified rubber solvated in a common organic solvent, such as toluene or heptane. Solvent formulated stencil fillers having a solvating medium are brushed on the stone, and dry to form a slightly tacky rubber surface to which the stencil can facilely adhere. Following application of the stencil and the sandblasting process, the stencil is stripped off. Depending on various factors, such as the degree of surface roughness of the underlying stone, there will be varying amounts of residual stencil filler coating left on the stone after the stencil is removed. This residual stencil filler coating has to be cleaned off the stone. Solvent formulated stencil filler coatings have traditionally been removed using an organic solvent, such as unleaded gasoline (which contains toluene and heptane as well as multiple other components) or varsol. Generally speaking, much more solvent is required to clean the stone than was present as the solvating medium in stencil filler.

In the recent past, seepage of organic solvents into ground water has been identified as a significant environmental issue. In response, restrictive local, state, and federal regulations on ground water have been passed which serve to limit, and ultimately eliminate, the use of most common organic solvents. In some states, for instance California, in addition to the ground water regulations, there are stringent air emission standards which read on the use of volatile organic solvents. As previously alluded to, many of these volatile organic solvents are commonly utilized as the solvating medium in stencil fillers, and also as the solvent used to clean the stone.

In addition to organic solvents, acids, such as muriatic acid, have been used to remove the solvent formulated stencil filler coating from the surface of the stone monument. However, regulatory agencies monitor the pH level of waste water as well as organic solvent content.

In summary, a solvent formulated stencil filler is a flammable source of VOC air emissions during drying. Secondly, a conventional solvent formulated stencil filler dries to a coating which is substantially impervious to water, and requires the use of solvents to clean off following sandblasting.

There exists a need for a water based stencil filler which doesn't contain volatile organic solvents, where the water based stencil filler is stipulated interchangeable with the solvent formulated stencil filler. The dried primer coating derived from a water based stencil filler must have adhesion properties which are comparable to a dried primer coating derived from a solvent formulated stencil filler, as there are no changes anticipated for the pressure sensitive adhesive on the stencil sheet. A further consideration is that the dried primer coating derived from a water based stencil filler can be removed from the surface of a stone monument without the use of organic solvents or acids, and that no hazardous waste stream is produced as a consequence of the cleaning process. The limitation of the stipulated interchangeability constrains the water based stencil filler such that it must dry at room temperature in a relatively short time-frame without the use of auxiliary heat. Granite, the preferred stone for monuments has a very high heat capacity ("sweats"), and can contain several percent of water by weight. In light of the practical realities imposed by the properties of stone, one is lead to the conclusion that the drying process is such that it is highly unlikely that a water based stencil filler will ever completely dry. Therefore, a final consideration is that the water based stencil filler coating must attain stipulated interchangeability of the "dried" coating while water is still present on the order of several percent on a weight basis in the "dried" coating.

Schwartz 4,419,481 reads on a water based adhesive that when dried at 250 F for 2 minutes forms a pressure sensitive adhesive coating. Properties of a room temperature dried adhesive are not discussed, but can be anticipated to be significantly different. The Elberton Granite Association has a number of bulletins that teach the current technology of sandblasting, and more specifically the utilization of stencil filler. Evans et al 4,183,834 reads on a resinous polyelectrolyte, and Evans an al 4,477,613 reads on a carboxyl-containing rosin derived resinous composition having an acid value of from 30 to 150 and a softening point of from –25 C to 150 C, at least partially neutralized with a counter ion capable of carrying the resinous composition into solution or dispersion in water. In the instant invention, it was discovered that certain unanticipated properties of Evans et al 4,183,834 and 4,477,613 could be exploited and expanded upon to produce a substantially hydrophobic rubbery coating that, even as a dried filmic coating, would be rewettable in copious quantities of water.

BRIEF DESCRIPTION OF THE INVENTION

The instant invention is a tackified elastomer aqueous dispersion formulation containing (a) from 10% to 40% by weight of the total dry weight of the formulation solids of a rosin derived resinous composition which is substantially a polyhydric alcohol rosin ester dispersion, (b) from 10% to 40% by weight of the total dry weight of the formulation solids of a carboxyl-containing rosin derived resinous composition having an acid value of from 30 to 150 and a softening point of from −25 C to 150 C, at least partially neutralized with a counter ion capable of carrying the resinous composition into solution or dispersion in water, (c) from 0.1% to 5% by weight of the total dry weight of the formulation solids of a supplemental surfactant, and (d) from 40% to 70% by weight of the total dry weight of the formulation solids of an elastomer. The water based stencil filler is usually supplied at an overall dry solids content at 51% or higher, with water making up the balance. The high solids enables relatively fast drying, on the order of 10 minutes at 25 C when applied with a brush, and a shorter drying time when applied with a compressed air sprayer. The instant invention dries to a slightly tacky coating having a high affinity for the stone monument, and the pressure sensitive adhesive on stencil. The freshly applied coating changes from a bluish-white coating to a clear film as the drying process proceeds. After sandblasting, the dried coating of the water based stencil filler can be cleaned off the stone by flooding the coating with copious quantities of water. The presence of water causes the dried coating to re-wet, turning white as the filmic integrity breaks down. High pressure water and brushing can expedite the clean up process.

DETAILED DESCRIPTION OF THE INVENTION

The instant invention is a tackified elastomer aqueous dispersion formulation comprised of (a) from 10% to 40% by weight of the total dry weight of the formulation solids of a rosin derived resinous composition which is a substantially a polyhydric alcohol rosin ester dispersion, (b) from 10% to 40% by weight of the total dry weight of the formulation solids of a carboxyl-containing rosin derived resinous composition having an acid value of from 30 to 150 and a softening point of from −25 C to 150 C, at least partially neutralized with a counter ion capable of carrying the resinous composition into solution or dispersion in water, (c) from 0.1% to 5% by weight of the total dry weight of the formulation solids of a supplemental surfactant, and (d) from 40% to 70% by weight of the total dry weight of the formulation solids of an elastomer.

The polyhydric alcohol rosin ester dispersion is, typically, substantially a glycerol or pentaerythritol ester of a tall oil rosin having a softening point from 60–140 C dispersed in water. The polyhydric alcohol rosin ester dispersion contains carboxylic acid moieties which are neutralized with an amino ionizing agent such as ammonia, N,N-dimethylaminoethanol, triethanolamine, triethylamine, diethanolamine, monoethanolamine, triisopropanolamine, diisopropanolamine, monoisopropanolamine. Sometimes minor portions of an inorganic base such potassium hydroxide, sodium hydroxide or soda ash are employed. The preferable polyhydric alcohol rosin ester has a softening point around 90 C. It generally known in the art that higher softening point tackifiers produce adhesives having superior shear properties to lower softening point tackifiers.

The carboxyl-containing rosin derived resinous composition neutralized with a counter ion is an aqueous dispersion comprised substantially of a resinous polyelectrolyte, wherein the resinous polyelectrolyte is an ionizable resinous mixture which is the reaction product of a rosin, a carboxylic acid, and a C1–C18 mono-alcohol. The ionizable resinous mixture is ionized with an amino ionizing agent, which is the counter ion of the carboxyl-containing rosin derived resinous composition. The carboxylic acid is usually an alpha, beta-unsaturated acid such as maleic anhydride or fumaric acid, which has a labile double bond that can undergo Diels Alder addition to the rosin. Sufficient mono-alcohol is present to partially esterify the acid. Representative mono-alcohols include for example butanol, hexanol, cyclohexanol, octanol, lauryl alcohol, decanol, cetyl alcohol, octadenanol, 2-ethyl hexanol and isopropanol. A presently preferred alcohol for esterification is decanol. The proportion of amino ionizing agent added to the ionizable resinous mixture is sufficient for stably dispersing the ionizable resinous mixture in water, and often an amount in excess of this proportion is used. The preferred amino ionizing agent is N,N-dimethylaminoethanol, which has a boiling point of 135 C. N,N-dimethylaminoethanol has a relatively low vapor pressure at room temperature, yet is sufficiently volatile not to build up in ground water. N,N-dimethylaminoethanol is considered relatively low in toxicity. The carboxyl-containing rosin derived resinous composition neutralized with a counter ion is an excellent dispersing agent for the elastomer, while at the same time it also imparts a a certain degree of tack. In the best known method of the instant invention the carboxyl-containing rosin derived resinous composition neutralized with a counter ion has a softening point less than 30 C so as to improve coalescence of the coating into a continuous film during drying.

The third ingredient, a supplemental surfactant is necessarily included in the water based stencil filler formulation hereof, to augment water susceptibility of the dried coating, therein facilitating water cleanup of the monument. Generally, from 0.1% to 5% by weight of the total dry weight of the composition solids is included. The supplemental surfactant is preferably an anionic surfactant, although a nonionic surfactant can be used. For most purposes, from 0.2 to 1.0% will suffice, and most satisfactory results are secured at the a level of 0.7% by weight of the total dry weight of the composition solids of the formulation. The anionic surfactant useful herein is characterized by an oil soluble or organophilic group and a salt or soap forming group, such as the sodium or potassium salt of a sulfate. Sodium lauryl sulfate is the preferred supplemental surfactant in the instant invention.

The fourth ingredient of the water based stencil filler is an aqueous dispersion or emulsion of an elastomer, wherein the elastomer is a natural or synthetic rubber, or a combination of one or more rubbers. The aqueous dispersion or emulsion of an elastomer include but are not limited to lattices of natural rubber, carboxylated-styrenebutadiene rubber, polyisoprene rubber, polyurethane rubber, chlorinated rubber, acrylonitrile-butadiene rubber, acrylonitrile-butadiene-styrene rubber, styrenated block copolymer rubber. A preferred embodiment of the instant invention hereof, is an aqueous dispersion or emulsion of an elastomer wherein said elastomer is principally a latex of natural rubber. A latex of natural rubber dries, at ambient temperatures, to a continuous elastic sheet, which when immersed in water, rewets and can be facilely removed from a stone surface. Natural rubber latex contains intrinsic proteinaceous components that act as surfactants, therein expediting the rewetting process. Natural rubber lattices are offered commercially by Firestone Tire and Rubber Company under the tradename of HARTEX 102R. Natural rubber latex is available at dry solids in excess of 60% (generally in the range of 62–64%), which is desirous as high solids enable the water based stencil filler to be formulated at high solids. High solids are required to achieve coating drying times that are of the same order of magnitude as solvent formulated stencil filler. From 40% to 70% by weight of the total dry weight of the composition solids is an elastomer, wherein the preferred dry weight percent of the elastomer of the composition is around 50%.

A blend of natural rubber latex and synthetic rubber lattices is preferably employed, wherein said blend is formulated to enhance stability of the natural rubber latex. The preferred synthetic rubber is also selected because of its compatibility with natural rubber and contribution to the adhesive properties of the water based stencil filler. In the best known embodiment of the instant invention, of the 50% elastomer on total dry weight of the composition solids, usually 50–80% of the dry weight of the elastomer is natural rubber, with the balance being a synthetic rubber. Lattices of carboxylated-styrene-butadiene rubber, and in particular lattices wherein the styrenic percentage of the carboxylated-styrene-butadiene rubber is from 50–65%, augment the adhesive properties of water based stencil fillers. In a preferred embodiment, the carboxylated-styrene-butadiene rubber has a styrenic percentage of approximately 55%. The carboxylated-styrene-butadiene rubber accounts for 38% of the total dry elastomer, and natural rubber accounts for 62%. Water based stencil filler formulated with carboxylated-styrene-butadiene rubber, when applied, produced, an air dried coating in ten minutes, that had an unanticipated high degree of tack, in light of the high styrenic percentage. High styrenic percentage carboxylated-styrene-butadiene coatings are generally used as tack-free clear coats on textiles or paper. The level of shear was comparable to the solvent formulated stencil filler, and the water based stencil filler was interchangeable with the same, even though ten minutes was insufficient drying time for all the water to evaporate.

It was observed that coatings prepared from carboxylic-styrene-butadiene rubber having a styrenic percentage in excess of 65% were poorly coalesced, presumably because the Tg is significantly above room temperature.

It was further observed that the inclusion of (e) dilution water was beneficial to prevent skimming-over of the water based stencil filler and to augment applications using sprayers.

It was additionally found that the inclusion of (f) a biocide enhanced aging properties of water based stencil filler on the shelf.

EXAMPLE 1

To a stainless steel paddle mixer vessel was added 109 kg of a 62% solids natural rubber latex, HARTEX 102HR from Firestone Tire and Rubber Company, and 81 kg of 50% solids lattices of carboxylated-styrene-butadiene rubber, Gen Flo 3003 from Diversitech General, a Gen Corp company. To this mixture was added 109 kg of a 55% solids of 27 C softening point carboxyl-containing rosin derived resinous composition neutralized with N,N-dimethylaminoethanol aqueous dispersion from Arizona Chemical. To the foregoing mixture was added 94 kg of a 50% solids 90 C softening point polyhydric alcohol rosin ester dispersion, also from Arizona Chemical. 5 kg of a 30% solids dispersion of sodium lauryl sulfate containing minor amounts of a biocide was added next. To prevent skimming, 14 kg of water is added and the formulation is stirred for 2 hours. Overall solids of the water based stencil filler was 53%. To test the adhesion properties, a coating of the water based stencil filler is brushed onto a granite panel, which is air dried for 10 minutes. The coating changes from a bluish white to a clear coating with a slight amber cast. A double process 1 inch strip of stencil having a Mylar interliner is applied to the surface using a 2 kg rubber roller. The 90 peel adhesion was 2.0 kg, with a specified acceptable range of 1.14 kg–2.57 kg.

TABLE 1

| Raw Materials | Vendor | Amount wet-kg | % Solids | Amount Dry-kg | % Dry Formula | % Wet Formula |
|---|---|---|---|---|---|---|
| Natural Rubber Latex | Firestone | 109.0 | 62.1% | 67.7 | 31.2% | 26.3% |
| 90 C Polyhydric Rosin | Arizona | 93.6 | 50.0% | 46.8 | 21.6% | 22.6% |
| 27 C Carboxyl Rosin Resin | Arizona | 108.9 | 55.0% | 59.9 | 27.7% | 26.2% |
| Carboxylated SBR | DiversiTech General | 81.4 | 50.0% | 40.7 | 18.8% | 19.6% |
| Sodium Lauryl Sulfate | - - | 5.1 | 30.3% | 1.5 | 0.7% | 1.2% |
| Water | - - | 17.0 | 0.0% | 0.0 | 0.0% | 4.1% |
| | Total | 415.0 | | 216.6 | 100.0% | 100.0% |
| % SOLIDS | 52.2% | | | | | |

TABLE 2

| Raw Materials | Vendor | Amount wet-kg | % Solids | Amount Dry-kg | % Dry Formula | % Wet Formula |
|---|---|---|---|---|---|---|
| Natural Rubber Latex | Firestone | 109.0 | 62.1% | 67.7 | 31.2% | 26.3% |
| 90 C Polyhydric Rosin | Arizona | 43.5 | 50.0% | 21.8 | 10.0% | 10.5% |
| 27 C Carboxyl Rosin Resin | Arizona | 150.0 | 55.0% | 82.5 | 38.1% | 36.1% |
| Carboxylated SBR | DiversiTech General | 81.4 | 50.0% | 40.7 | 18.8% | 19.6% |
| Sodium Lauryl Sulfate | - - | 5.1 | 30.3% | 1.5 | 0.7% | 1.2% |
| Water | - - | 17.0 | 0.0% | 0.0 | 0.0% | 4.1% |
| | Total | 406.0 | | 214.2 | 98.9% | 97.8% |
| % SOLIDS | 52.8% | | | | | |

EXAMPLE 2

To a stainless steel paddle mixer vessel was added 109 kg of a 62% solids natural rubber latex, HARTEX 102HR from Firestone Tire and Rubber Company, and 81 kg of 50% solids lattices of carboxylated-styrene-butadiene rubber, Gen Flo 3003 from Diversitech General, a Gen Corp company. To this mixture was added 150 kg of a 55% solids of 27 C softening point carboxyl-containing rosin derived resinous composition neutralized with N,N-dimethylaminoethanol aqueous dispersion from Arizona Chemical. To the foregoing mixture was added 43.5 kg of a 50% solids 90 C softening point polyhydric alcohol rosin ester dispersion, also from Arizona Chemical. 5 kg of a 30% solids dispersion of sodium lauryl sulfate containing minor amounts of a biocide was added next. To prevent skimming, 14 kg of water is added and the formulation is stirred for 2 hours. Overall solids of the water based stencil filler was 53%. To test the adhesion properties, a coating of the water based stencil filler is brushed onto a granite panel, which is air dried for 10 minutes. The coating changes from a bluish white to a clear coating with a slight amber cast. A double process 1 inch strip of stencil having a Mylar interliner is applied to the surface using a 2 kg rubber roller. The 90 peel adhesion was 3.0 kg, with a specified acceptable range of 2.0 kg–4.0 kg. Shear was lower, tack level was borderline too high for easy removal of stencil pattern cuts.

EXAMPLE 3

Same as Example 1, except the percentage of natural rubber latex is increased with a corresponding decrease in the percentage of carboxylated-styrene-butadiene rubber. Dried coating had good adhesion, however adhesive was very stringy, making double process work difficult. Shear was significantly lower, and during sandblasting there were a couple of blow ups.

TABLE 3

| Raw Materials | Vendor | Amount wet-kg | % Solids | Amount Dry-kg | % Dry Formula | % Wet Formula |
|---|---|---|---|---|---|---|
| Natural Rubber Latex | Firestone | 180.0 | 62.1% | 111.8 | 51.6% | 43.4% |
| 90 C Polyhydric Rosin | Arizona | 93.6 | 50.0% | 46.8 | 21.6% | 22.6% |
| 27 C Carboxyl Rosin Resin | Arizona | 108.9 | 55.0% | 59.9 | 27.7% | 26.2% |
| Carboxylated SBR | DiversiTech General | 10.0 | 50.0% | 5.0 | 2.3% | 2.4% |
| Sodium Lauryl Sulfate | — | 5.1 | 30.3% | 1.5 | 0.7% | 1.2% |
| Water | — | 35.0 | 0.0% | 0.0 | 0.0% | 8.4% |
| | Total | 432.6 | | 225.0 | 103.9% | 104.2% |
| % SOLIDS | 52.0% | | | | | |

Monuments were coated with Examples 1,2 and 3 water based stencil filler. Filler is dry as evidenced by a change from a bluish white, when wet, to a clear coating with a slight amber cast, when dry. After coating is dry, stencil is positioned on monument. Following sandblasting, the stencil is stripped off. Most of the filler comes off with the stencil. Residual water based stencil filler, sandblast grit and granite dust is cleaned off the monument by laying the monument flat, and flooding the surface with copious quantities of tepid water. The water based stencil filler rewets after a few seconds as evidenced by its change in color. When the residual water based stencil filler is fully rewetted it is a milky white. The cleaning process is completed using a directed pressurized spray of water, and a brush on particularly tenacious detrius.

We claim:

1. A water based stencil filler that is a tackified elastomer aqueous dispersion having a formulation solids that is comprised of (a) from 10% to 40% by weight of the total dry weight of the formulation solids of a rosin derived resinous composition which is substantially a polyhydric alcohol rosin ester dispersion, (b) from 10% to 40% by weight of the total dry weight of the formulation solids of a carboxyl-containing rosin derived resinous composition having an acid value of from 30 to 150 and a softening point of from −25 C to 150 C, at least partially neutralized with a counter ion capable of carrying the resinous composition into solution or dispersion in water, (c) from 0.1% to 5% by weight of the total dry weight of the formulation solids of a supplemental surfactant, and (d) from 40% to 70% by weight of the total dry weight of the formulation solids of an elastomer, wherein said elastomer is a blend of rubbers comprised of a natural rubber latex and a latices of carboxylated-styrene-butadiene rubber, wherein said latices of carboxylated-styrene-butadiene rubber has a styrenic weight percentage that is from 55–65% on a dry weight basis of the carboxylated-styrene-butadiene rubber.

2. A water based stencil filler as claimed in claim 1 wherein the supplemental surfactant is sodium lauryl sulfate.

3. A water based stencil filler as claimed in claim 1 wherein the carboxyl-containing rosin derived resinous composition is comprised substantally of an aqueous dispersion comprised substantally of a resinous polyelectrolyte, wherein the resinous polyelectrolyte is an ionizable resinous mixture which is the reaction product of a rosin, a carboxylic acid, and a C1–C18 mono-alcohol.

4. A water based stencil filler as claimed in claim 3 wherein the ionizable resinous mixture is the reaction product of a tall oil rosin, an alpha, beta-unsaturated acid, and decanol.

5. A resinous polyelectrolyte as claimed in claim 3 wherein the ionizable resinous mixture is ionized with an amino ionizing agent.

6. A water based stencil filler as claimed in claim 1 wherein the polyhydric alcohol rosin ester dispersion is substantially a glycerol or pentaerythritol ester of a tall oil rosin having a softening point from 60–140 C and a carboxylic acid moieties which is neutralized with an amino ionizing agent.

7. A water based stencil filler as claimed in claim 5 wherein the amino ionizing agent is N,N-dimethylaminoethanol.

8. A water based stencil filler as claimed in claim 1 which is further characterized by the presence therein of (e) a dilution water.

9. A water based stencil filler as claimed in claim 1 which is further characterized by the presence therein of (f) a biocide.

* * * * *